(12) United States Patent
Tomren (10) Patent No.: US 10,604,029 B2
(45) Date of Patent: Mar. 31, 2020

(54) TROLLEY FOR CAMERA DOLLY WITH INTEGRATED CABLE MANAGEMENT

(71) Applicant: Electric Friends AS, Bergen (NO)

(72) Inventor: Anders Tomren, Oslo (NO)

(73) Assignee: Electric Friends AS, Bergen (NO)

( * ) Notice: Subject to any disclaimer, the term of this patent is extended or adjusted under 35 U.S.C. 154(b) by 0 days.

(21) Appl. No.: 16/377,656

(22) Filed: Apr. 8, 2019

(65) Prior Publication Data
US 2019/0308523 A1 Oct. 10, 2019

(30) Foreign Application Priority Data
Apr. 9, 2018 (NO) .................................. 20180485

(51) Int. Cl.
*H02G 11/02* (2006.01)
*B60M 1/20* (2006.01)
*F16M 11/42* (2006.01)
*F16M 11/18* (2006.01)
*H02G 1/00* (2006.01)

(52) U.S. Cl.
CPC .............. *B60M 1/20* (2013.01); *F16M 11/18* (2013.01); *F16M 11/425* (2013.01); *H02G 1/00* (2013.01)

(58) Field of Classification Search
CPC .......... B60M 1/20; B66C 13/12; H02G 11/00; H02G 11/006; H02G 11/02; H02G 1/00; F16M 11/18; F16M 11/425
USPC ........................................... 191/12.2 A–12 C
See application file for complete search history.

(56) References Cited

U.S. PATENT DOCUMENTS

| | | | | | |
|---|---|---|---|---|---|
| 1,772,548 | A | * | 8/1930 | Levin ........................ | B61C 3/00 191/12 R |
| 3,551,612 | A | * | 12/1970 | Guentner ................ | F16L 3/015 191/12 C |
| 3,630,325 | A | * | 12/1971 | Corl ........................ | B66C 13/12 191/12 C |
| 3,833,774 | A | * | 9/1974 | Mills ........................ | B66C 13/12 191/12 R |

(Continued)

FOREIGN PATENT DOCUMENTS

JP  S56164687 A  12/1981

OTHER PUBLICATIONS

Norwegian Industrial Property Office Action dated Nov. 9, 2018, for corresponding Application No. 20180485; Filing Date: Apr. 9, 2018 consisting of 5-pages.

*Primary Examiner* — Zachary L Kuhfuss
(74) *Attorney, Agent, or Firm* — Christopher & Weisberg, P.A.

(57) ABSTRACT

The present embodiments relate to a trolley system for a camera dolly. The system comprising at least one trolley comprising a power drive for driving the trolley in both a forward and reverse direction, a cable handling and a storage arrangement; a station for operative connection to the at least one trolley; one cable connecting the station and the at least one trolley; a power device for supplying power to the trolley; and at least one rail adapted to receive the at least one trolley, the at least one rail comprising at least one rail recess, and the cable handling and storage arrangement is adapted to deploy the at least one cable in the at least one rail recess as the trolley moves away from the station and take up the at least one cable from the at least one rail recess as the trolley moves toward the station.

5 Claims, 6 Drawing Sheets

(56) References Cited

U.S. PATENT DOCUMENTS

| | | | | | |
|---|---|---|---|---|---|
| 3,853,209 | A | * | 12/1974 | Bond | H02G 11/00 191/12.2 R |
| 5,332,865 | A | * | 7/1994 | Jensen | H02G 11/00 174/98 |
| 5,551,545 | A | * | 9/1996 | Gelfman | H02G 11/02 191/12.2 A |
| 8,061,495 | B2 | * | 11/2011 | Ichimura | B60L 5/005 104/98 |
| 8,499,911 | B2 | * | 8/2013 | Ichimura | B66C 13/12 191/12 R |
| 9,868,450 | B2 | * | 1/2018 | Tomren | B61B 13/00 |
| 2007/0251408 | A1 | * | 11/2007 | Fletcher | B61B 13/02 104/247 |

\* cited by examiner

TROLLEY FOR CAMERA DOLLY WITH INTEGRATED CABLE MANAGEMENT

CROSS-REFERENCE TO RELATED APPLICATION

This application is related to and claims priority to Norway Application Serial No. 20180485, filed Apr. 9, 2018, entitled TROLLEY SYSTEM, the entirety of which is incorporated herein by reference.

FIELD

The present embodiment relates to generally to trollies, but more particularly to a trolley system with integrated cable management.

BACKGROUND

Camera dollies are used in the television and motion picture industries to support and maneuver a camera. Typically, the camera dolly is on wheels and has an arm to raise and lower the camera. The camera dolly is generally moved by dolly operators either by a manual hands-on steering or remotely controlled by operators in a production control room.

In the production of motion pictures, the motion picture camera must often be moved from one position to another. The camera movements may require a change in camera position, camera angle, or camera elevation. The camera movement must be performed smoothly, as even small amounts of vibration of the camera can result in unsatisfactory filming, due to shaky or erratic recorded images. Similar requirements must often be met in the case of TV studio productions, e.g. predefined camera movements along the studio floor.

Camera dollies and pedestals have long been used to support and move television studio cameras. The camera dolly must support and maneuver the camera with a minimum of vibration or shock, to avoid degrading the filmed image quality. Consequently, camera dollies are designed, manufactured and maintained with precision, and are often placed on rails or tracks on the studio floor to provide an even and smooth rolling surface.

Television studio cameras are connected to the production control room with signal cables, such as triax cables or fiber optic cables. Wireless transfer of signals is not feasible due to the large amounts of data that is transferred. The cameras are also connected to a power supply via power cables. In addition to the cameras, remote controlled camera dollies require power to drive the dolly as well as control signals from the production room to dolly to steer the dolly. These signal and power cables are usually lying on the floor of the studio and is often in the way when the camera dollies are moved. Other solutions, in particular for dollies on tracks, may involve complex cable management systems requiring tracks of their own.

Therefore, there is a need for a trolley system for a camera dolly resolving the abovementioned problems.

SUMMARY

According to a first aspect of the embodiments herein it is provided a trolley system for a camera dolly comprising at least one trolley comprising a power drive for driving the trolley in both a forward and reverse direction and a cable handling and a storage arrangement, a station for operative connection to the at least one trolley, one cable connecting the station and the at least one trolley, a power device for supplying power to the trolley, wherein the system further comprises at least one rail adapted to receive the at least one trolley, the at least one rail comprising at least one rail recess, and the cable handling and storage arrangement is adapted to deploy the at least one cable in the at least one rail recess as the trolley moves away from the station and take up the at least one cable from the at least one rail recess as the trolley moves toward the station.

BRIEF DESCRIPTION OF THE DRAWINGS

The following detailed description of the present embodiments is accompanied by drawings to make it easily understandable:

FIG. 3a is a side view of an exemplary cable handling and storage arrangement, FIG. 3b is a detail of FIG. 3a, FIG. 4 is a perspective view of a detail of an exemplary cable handling and storage arrangement.

DETAILED DESCRIPTION

In the following, the present embodiments will be discussed, and examples are presented with reference to the attached figures.

In the embodiments disclosed herein, a new trolley system is presented, particularly adjusted to camera dollies used in the television and motion picture industries to support and maneuver a camera. However, the trolley system may be equally suitable as a trolley platform for e.g. production robots. The trolley system comprises a least one rail adapted to receive at least one trolley. The at least one rail is provided with at least one rail recess. The system comprises a station for operative connection to the at least one trolley, and one cable connecting the station and the at least one trolley. The station may e.g. be a television production control room. The at least one trolley comprises a power drive for driving the trolley in both a forward and reverse direction and a cable handling and storage arrangement carried thereon. The cable handling and storage arrangement is adapted to deploy the cable in the at least one rail recess as the trolley moves away from the station and take up the cable from the at least one rail recess as the trolley moves toward the station. The trolley system further comprises a power device for supplying power to the trolley.

Figures 1A, 1B:
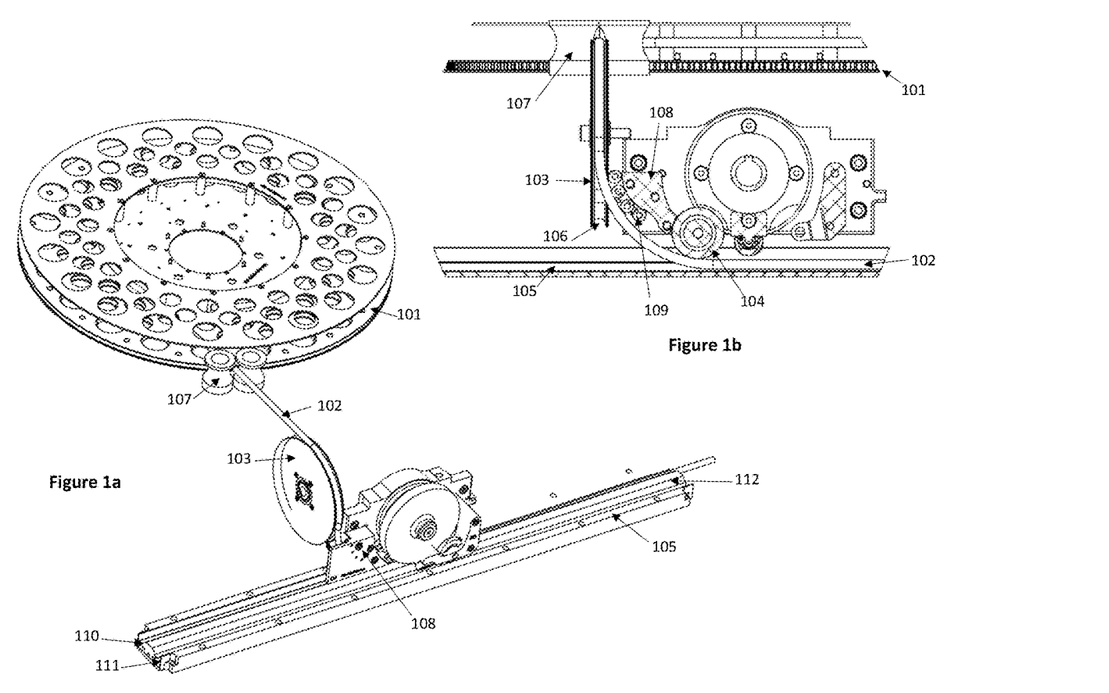
FIG. 1a is a perspective view of an exemplary cable handling and storage arrangement.
FIG. 1b is a cross section of the exemplary cable handling and storage arrangement of FIG. 1a, FIG. 2a is a top view of an exemplary cable handling and storage arrangement.

FIGS. 1a and 1b shows respectively a perspective view and a cross section view of a cable handling and storage arrangement in combination with a rail 105 according to one embodiment. The cable handling and storage arrangement is carried by the trolley. The cable handling and storage arrangement comprises a horizontal reel 101 adapted to hold a cable 102. Horizontal meaning substantially horizontal with respect to a rail 105 on which the trolley system stands. A first vertical wheel 103 is positioned between the reel 101 and the rail 105, perpendicular to the rail 105. Vertical meaning substantially vertical with respect to the rail 105. The first wheel 103 has a cable recess 106 on its edge to adapted to guide the cable 102 over the first wheel 103. A second vertical wheel 104 is positioned parallel to and above a first rail recess 110 in the rail 105. The cable handling and storage arrangement may also comprise vertical rollers 107 between the reel 101 and the first vertical wheel 103 to guide the cable 102 onto the first vertical wheel 103. When the trolley moves away from a station 200 to which the cable 102 is connected, i.e. in the opposite direction of arrow 200, the cable 102 is reeled out from the reel 101, runs over the first vertical wheel 103 downwards perpendicular to the rail 105 and runs under the second vertical wheel 104 parallel to the rail 105 so as to be deployed in the first rail recess 110 of the rail 105. When the trolley moves toward the station 200, i.e. in the direction of arrow 200, the cable 105 runs under the second vertical wheel 104 parallel to the rail 105 and over the first vertical wheel 103 onto the reel 101 to take up the cable 102 from the first rail recess 110.

In one embodiment, the cable handling and storage arrangement further comprises a cable guide 108 positioned between the first vertical wheel 103 and the second vertical wheel 104, parallel to and above the at least one rail recess 110 of the rail 105. The cable guide 108 may guide the cable 105 through the bend from the first vertical wheel 103 to the second vertical wheel 104. The bend from the first vertical wheel 103 to the second vertical wheel 104 is illustrated to be substantially 90 degrees, but any other suitable degree of the bend is also applicable. In one embodiment the cable guide 108 is provided with a plurality of rollers 109.

In one embodiment, the rotation of the reel 101 is adapted to keep a tension of the cable 102 at a predetermined level when deploying and taking up the cable 102. The reel 101 may be controlled by a servomotor.

FIGS. 1a and 1b also shows a second rail recess 111 and a drive rail 112, and these will be described in more detail with reference to FIGS. 2a and 2b below.

Figure 2A:
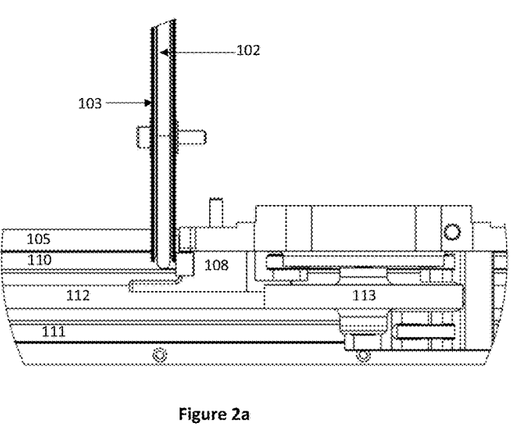
Figure 2B:
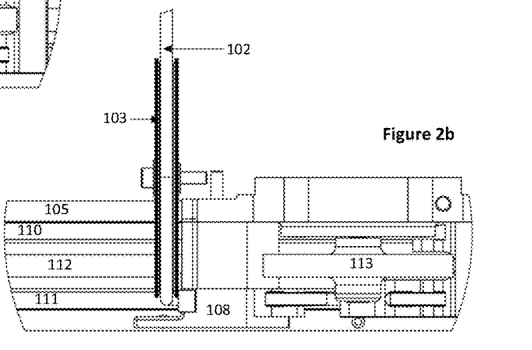
FIG. 2b is a top view of another exemplary cable handling and storage arrangement.

FIGS. 2a and 2b shows a top view of two different configurations of the cable handling and storage arrangement in combination with a rail 105 according to one embodiment. The rail 105 is provided with two rail recesses, i.e. the first rail recess 110 and the second rail recess 111 separated by a drive rail 112, e.g. a profiled rubber path. A drive wheel 113 is connected to a power drive on the trolley, and drives the trolley in a forward and reverse direction on the drive rail 112.

FIG. 2a is a top view of the configuration shown in FIG. 1a and 1b. When the trolley moves away from the station 200, i.e. in the opposite direction of arrow 200, the cable 102 is reeled out from the reel 101, the cable 102 runs over the first vertical wheel 103 downwards perpendicular to the first rail recess 110 of the rail 105 and runs under the second vertical wheel (not shown) parallel to and over the first rail recess 110 of the rail 105 so as to be deployed in the first rail recess 110 of the rail 105. When the trolley moves toward the station 200, i.e. in the direction of arrow 200, the cable 105 runs under the second vertical wheel (not shown) and over the first vertical wheel 103 onto the reel 101 to take up the cable 102 from the first rail recess 110.

FIG. 2b is a top view of a configuration where the cable 102 is being deployed in the second rail recess 111 of the rail 105. When the trolley moves away from the station 200, the cable 102 is reeled out from the reel 101, the cable 102 runs over the first vertical wheel 103 downwards perpendicular to the second rail recess 111 of the rail 105 and runs under the second vertical wheel (not shown) parallel to and over the second rail recess 111 of the rail 105 so as to be deployed in the second rail recess 111 of the rail 105. When the trolley moves toward the station 200, the cable 105 runs under the second vertical wheel (not shown) and over the first vertical wheel 103 onto the reel 101 to take up the cable 102 from the second rail recess 111.

Two trolleys, one configured to deploy a first cable 102 in the first rail recess 110, a second configured to deploy a second cable 102 in the second rail recess 111, can be driven on the same rail 105 simultaneously. Furthermore, the configurations shown in FIGS. 2a and 2b may be mirrored and positioned on the opposite side of the drive wheel 113. The mirrored configurations allow deploying the at least one cable 102 in the opposite direction of that illustrated in the drawings. Four trolleys can then be driven on the same rail 105 simultaneously. Two trolleys, each deploying a cable 102, in the first rail recess 110 from different directions on the rail, and two trolleys, each deploying a cable 102, in the second rail recess 111 from different directions on the rail.

Figures 3A, 3B:
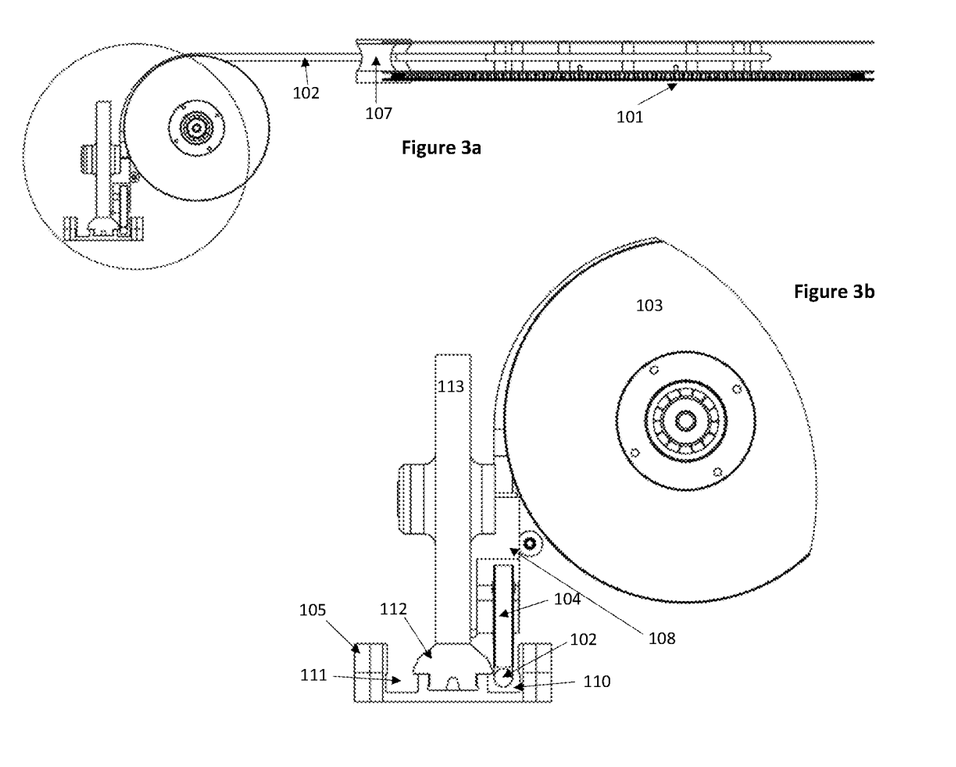

FIG. 3a shows a side view of the configuration shown in FIG. 1a and 1b. FIG. 3b shows an enlarged view of the encircled part of FIG. 3a. It is shown a horizontal reel 101 adapted to hold the cable 102, a first vertical wheel 103 positioned between the reel 101 and the first recess 110 of the rail 105, perpendicular to the rail 105, the first vertical wheel 103 having a cable recess (not shown) on its edge for guiding the cable 102, a second vertical wheel 104 positioned parallel to and above the first rail recess 110 of the rail 105.

Figure 4:
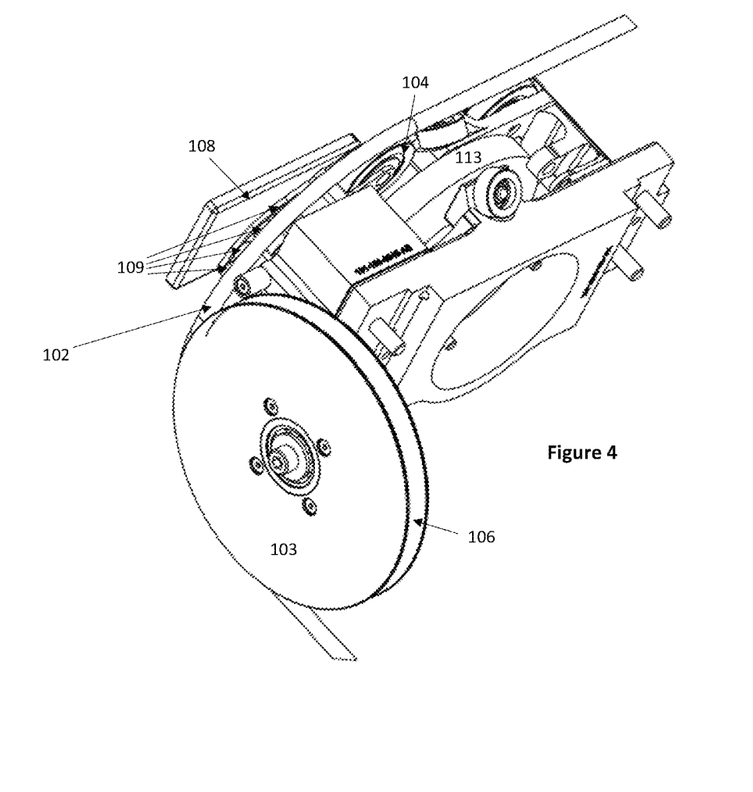

FIG. 4 shows a perspective view of a detail of a cable handling and storage arrangement according to one embodiment. It shows the first vertical wheel 103 and a cable recess 106 on its edge for guiding a cable 102, and a second vertical wheel 104. It is also shown a cable guide 108 positioned between the first vertical wheel 103 and the second vertical wheel 104. The cable guide 108 may guide the cable 102 through the bend from the first vertical wheel 103 to the second vertical wheel 104. The bend from the first vertical wheel 103 to the second vertical wheel 104 is illustrated to be substantially 90 degrees, but any other suitable degree of the bend is also applicable. In this embodiment the cable guide 108 is provided with four rollers 109 to further ease the 90 degrees bend from the first vertical wheel 103 to the second vertical wheel 104.

Figure 5:
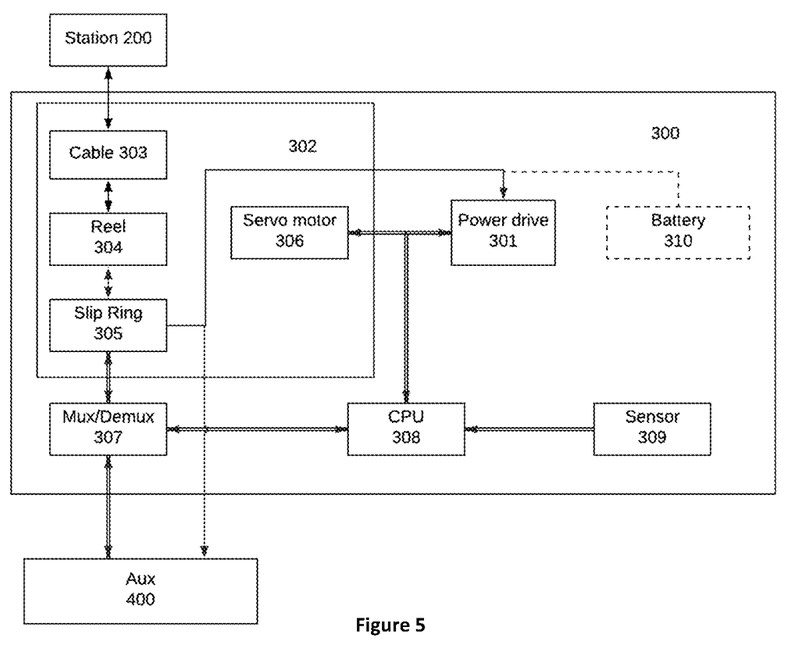
FIG. 5 is a schematic overview of a trolley system.

FIG. 5 is a schematic view of a trolley system according to one embodiment. The system comprises a station 200 for operative connection to the at least one trolley 300, and one cable 102 connecting the station 200 and the at least one trolley 300. The station may be a connection point for a television production control room. The station comprises at least one of a connection point for signaling, e.g. a computer connection, and a connection point for power, e.g. a power outlet. The at least one trolley 300 comprises a power drive 301 for driving the trolley 300 in both a forward and reverse direction and a cable handling and a storage arrangement 302 carried thereon. The trolley system further comprises a power device 310 for supplying power to the trolley 300. In one embodiment the power device 310 may be a battery 310. In another embodiment the power device 310 may be positioned at the station 200 and supply power to the trolley 300 via the cable 102. In that case, the cable 102 is a combined signaling and power cable. In one embodiment the signaling part of the cable 102 is an optical fiber. The cable handling and a storage arrangement 302 comprises a reel 101 to hold the cable 102 and a slip ring assembly 305 connected to the end of the cable 102. The slip ring assembly 305 may have a slip ring for the power and another slip ring for the signaling. The power is distributed from the slip ring assembly 305 to the power drive 301 and optionally to a servomotor 306 connected to the reel 101. The power may also be distributed to an auxiliary (aux) device 400 mounted on the trolley 300, such as a television studio camera or a production robot. The signaling from the slip ring assembly 305 is sent to a multiplexer/de-multiplexer (mux/demux) 307. Control signals to drive the trolley 300 is sent to a computer device (CPU) 308. From the computer device 308 signals are sent to the power drive 301 to move the trolley 300 forward or backward. The trolley 300 may also be provided with at least one sensor devices 309, such as proximity sensors and/or position sensors. The sensor devices 309 send data to the computer device 308. The computer device 308 may use the sensor data as input to control the trolley 300, or forward the data to the station 200 via the multiplexer/de-multiplexer 307, the slip ring assembly 305 and the cable 102. In example, a proximity sensor sensing an obstruction in front of the trolley 300 may cause the computer device 308 to stop the trolley 300. In one embodiment, the computer device 308 may control the rotation of the reel 101 to keep a tension of the cable 102 at a predetermined level when deploying and taking up the cable 102, based on an expected/detected movement of the trolley 300. The rotation of the reel 101 is controlled by sending control signals to a servomotor 306 controlling the reel 101. The computer device 308 determines the expected/detected movement of the trolley 300 based on the received control signals and signals from the optional sensor devices 309.

Figures 6A, 6B:
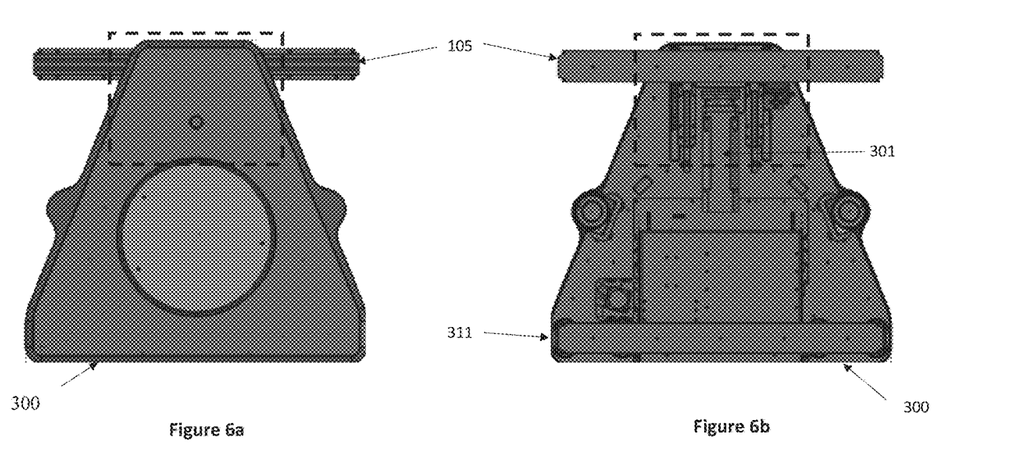
FIG. 6a is a top view of an exemplary trolley.
FIG. 6b is a bottom view of an exemplary trolley.

FIGS. 6a and 6b shows, respectively, a top view and a bottom view of a trolley 300 in combination with a section of a rail 105 according to one embodiment. The configuration of the cable handling and storage arrangement in combination with a rail 105 of FIG. 2a is in one embodiment positioned within the dashed square. As shown in FIG. 6b, the power drive 301 may be mounted on the underside of the trolley 300. The power drive 301 may be adjusted inwards towards the center of the trolley or outwards from the center of the trolley 300 to adjust for curvature of the rail 105. FIG. 6b shows an exemplary position of second rail 311 to receive the trolley.

It must be emphasized that the terminology "constitute/constitutes" and "comprise/comprises" as used in this specification is chosen to specify the presence of stated features, numbers, steps or components, but does not preclude the presence or addition of one or more other functions, numbers, steps, components or groups thereof. It should also be noted that the word "a" or "an" preceding an element does not exclude the presence of a plurality thereof.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. Therefore, the above embodiments should not be taken as limiting the scope, which is defined by the appending claims.

What is claimed is:

1. A trolley system for a camera dolly the trolley system comprising:
    at least one trolley comprising:
        a power drive for driving the trolley in both a forward and reverse direction;
        a cable handling and storage arrangement;
        a station for operative connection to the at least one trolley;
        at least one cable connecting the station and the at least one trolley; and
        a power device for supplying power to the trolley;
    wherein the system further comprises:
        at least one rail adapted to receive the at least one trolley, the at least one rail comprising at least one rail recess, and
        the cable handling and storage arrangement is adapted to deploy the at least one cable in the at least one rail recess as the trolley moves away from the station and to take up the at least one cable from the at least one rail recess as the trolley moves towards the station, the cable handling and storage arrangement further comprising:
            a horizontal reel adapted to hold the cable;
            a first vertical wheel positioned between the reel and the rail, perpendicular to the rail, the first vertical wheel having a cable recess on the edge of the first vertical wheel for guiding the cable;
            a second vertical wheel positioned parallel to and above the at least one rail recess; and
            a cable guide positioned between the first vertical wheel and the second vertical wheel, parallel to and above the at least one rail recess.

2. The system according to claim 1, wherein the cable guide is provided with a plurality of rollers.

3. The system according to claim 1, wherein rotation of the reel is adapted to keep a tension of the cable at a predetermined level when deploying and taking up the cable.

4. The system according to claim 3, wherein the rotation of the reel is controlled by a servomotor.

5. The system according to claim 1, wherein the cable is a combined optical fiber and power cable.

* * * * *